F. B. FRANKLIN.

Assignor to the Union Wire Mattress Co.

SPRING-BED BOTTOM.

No. 7,597. Reissued April 10, 1877.

WITNESSES:

J. C. Wilcke

N. H. Sherburne

INVENTOR:

Francis B. Franklin.

By Gridley & Sherburne.

Attorneys.

N. PETERS, PHOTO-LITHOGRAPHER, WASHINGTON, D. C.

UNITED STATES PATENT OFFICE

FRANCIS B. FRANKLIN, OF APPLETON, WISCONSIN, ASSIGNOR TO THE UNION WIRE MATTRESS COMPANY, OF CHICAGO, ILLINOIS.

IMPROVEMENT IN SPRING BED-BOTTOMS.

Specification forming part of Letters Patent No. 34,570, dated March 4, 1862; reissue No. 7,597, dated April 10, 1877; application filed March 16, 1877.

*To all whom it may concern:*

Be it known that I, FRANCIS B. FRANKLIN, of Appleton, in the county of Outagamie and State of Wisconsin, have invented new and useful Improvements in Spring Bed-Bottoms; and I do hereby declare the following to be a full, clear, and exact description thereof, which will enable others skilled in the art to which my invention appertains to make and use the same, reference being had to the accompanying drawing, forming part of this specification, in which—

Figure 1:
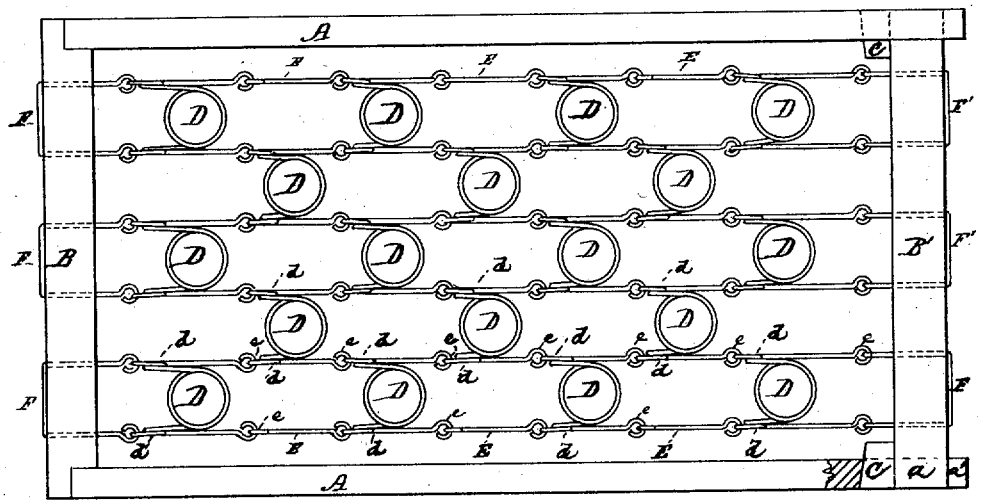
Figure 2:
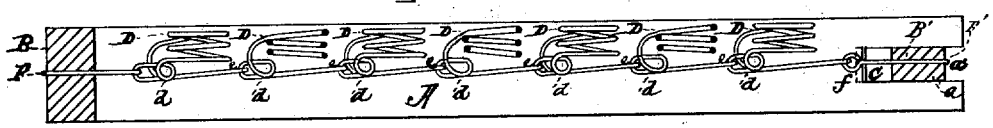

Figure 1 represents a general plan or top view of a spring bed-bottom embodying my said improvements, and Fig. 2 represents a longitudinal sectional elevation of the same.

Like letters of reference indicate like parts.

The object of my invention is to provide an elastic spring bed-bottom, arranged upon an independent frame, adapted to admit of being readily adjusted to the bedstead, between the side and end rails thereof, and to so construct the frame as to admit of the adjustment of one of the end bars thereof toward or from the other, and so as to produce the requisite longitudinal tension of the elastic spring bed-bottom.

To that end my invention consists in the combination, with the frame, of the bed-bottom proper, consisting of a series of coiled springs connected each to the other, so as to form an elastic laterally-connected and continuous web, attached only at its ends to the end bars of the frame, and so that the web will be suspended and receive its support from the said end bars; also, in the combination, with the said elastic continuous wire web or bed-bottom proper, of an adjustable end bar, so arranged as to support one end of the web, and admit of being moved on the side rails of the frame, toward or from the other end bar, so as to slacken or tighten the web, and thereby produce the required tension.

In the drawing, A A represent the side rails of the frame, which may be made of either wood or metal, and are of the proper length to fit loosely between the end rails of the bedstead. B and B′ are the end bars of the frame, which may also be made of either wood or metal, and are of the proper length to fit loosely between the side rails of the bedstead. The end bar B is permanently attached at its ends to one end of the side rails A A, respectively, and the end bar B′ is provided at its ends with tenons *a*, which are fitted loosely into longitudinal slots or mortises *a′*, formed through the ends of the rails A A opposite the bar B, and the tenons are so adjusted in the said mortises as to allow the said end bar B′ to be moved toward or from the end bar B at will. C C are wedge-shaped keys, adjusted to fit into the mortises *a′ a′*, between the end walls thereof and the edges of the tenons *a a*, respectively, by which means the end bar B′, upon being moved from the end bar B, is firmly held at any desired adjusted point.

D represents a series of coiled-wire springs, forming the bed-bottom proper. The ends of each of said springs are bent forward and coiled so as to form a loop, *d*, and are then again bent so as to extend horizontally backward under and on each side of the coiled portion of the spring, and are then bent at their ends, so as to form an eye or hook, *e*, as shown in Fig. 1.

The arrangement of said springs is such that the eyes or hooks *e* of each spring will take into the loop *d* of the next laterally-adjacent spring, thereby connecting the entire series of springs together, so as to form a continuous and laterally-connected web of sufficient length to admit of being connected to the end bars B and B′ of the frame, and of sufficient width to receive and support the bed.

E E are short pieces of wire, bent at their ends to form a hook or eye, and are connected at one end to the outer hook *e*, and at the other end to the outer loop *d* of the springs forming the sides of the web, thereby connecting them together at their outer sides.

F and F′ represent a series of staples, which pass through the end bars B and B′, respectively, and are bent at their inner ends so as to form hooks *f*, as shown in Fig. 2. The hooks of the staples F take into the loops *d* of the springs D at one end of the web, and the hooks of the staples F′ take into the eyes *e* of the springs D at the opposite ends of the web, thereby connecting the ends of the web firmly to the end bars B and B′ of the frame, so that the web may be slackened or tightened by moving the end bar B′ toward or from the end bar B.

Having thus described my invention, what I claim as new, and desire to secure by Letters Patent, is—

1. The continuous elastic web composed of spring links and links, substantially as set forth and described.

2. In a bed-bottom, the combination, with a rectangular frame, of the elastic wire web set forth and described, and stretched longitudinally between and supported wholly from the end bars of the frame, substantially as specified.

3. In a bed-bottom, the combination, with a frame, of the continuous wire web shown and described, supported wholly from its ends, and the end bar B′, adjustably connected with the side rails, so as to admit of being moved to or from the end bar B, to slacken or tighten the web longitudinally, substantially as and for the purpose set forth.

4. In a removable bed-bottom frame, the removable end piece B′, made adjustable, as set forth, and for the purpose specified.

FRANCIS B. FRANKLIN. [L. S.]

Witnesses:
A. H. KELLOGG,
A. R. LEWIS.